United States Patent [19]

Garbo

[11] 4,320,802
[45] Mar. 23, 1982

[54] USE OF LAND-FILL GAS TO STIMULATE CRUDE OIL PRODUCTION AND TO RECOVER METHANE-RICH GAS

[76] Inventor: Paul W. Garbo, 48 Lester Ave., Freeport, N.Y. 11520

[21] Appl. No.: 120,305

[22] Filed: Feb. 11, 1980

[51] Int. Cl.³ .................... E21B 43/16; E21B 43/40
[52] U.S. Cl. .................................. 166/267; 166/266
[58] Field of Search ............. 166/266, 267, 274, 275, 166/314; 55/68; 62/24

[56] References Cited

U.S. PATENT DOCUMENTS

| | | | |
|---|---|---|---|
| 2,623,596 | 12/1952 | Whorton et al. | 166/266 X |
| 2,729,291 | 1/1956 | Haverfield | 166/266 |
| 2,875,832 | 3/1959 | Martin | 166/266 |
| 2,880,801 | 4/1959 | Crump | 166/266 |
| 3,130,026 | 4/1964 | Becker | 62/24 X |
| 3,193,006 | 7/1965 | Lewis | 166/266 |
| 3,442,332 | 5/1969 | Keith | 166/266 |
| 3,453,835 | 7/1969 | Hochgesand | 55/68 X |
| 3,975,172 | 8/1976 | Ranke | 55/40 |
| 4,026,355 | 5/1977 | Johnson et al. | 166/314 X |

*Primary Examiner*—Stephen J. Novosad
*Attorney, Agent, or Firm*—Paul W. Garbo

[57] ABSTRACT

Land-fill gas containing principally methane and carbon dioxide is injected into a partially depleted oil reservoir to stimulate crude oil production. Solution of injected gas, especially carbon dioxide, in the crude oil materially reduces its viscosity which together with pressurization increases oil flow. Gas separated from produced oil is fractionated into valuable methane-rich gas and carbon dioxide-rich gas which is recycled to the oil reservoir. Part or all of the land-fill gas may be first fractionated and the resultant carbon dioxide-rich gas then injected into the reservoir.

9 Claims, 1 Drawing Figure

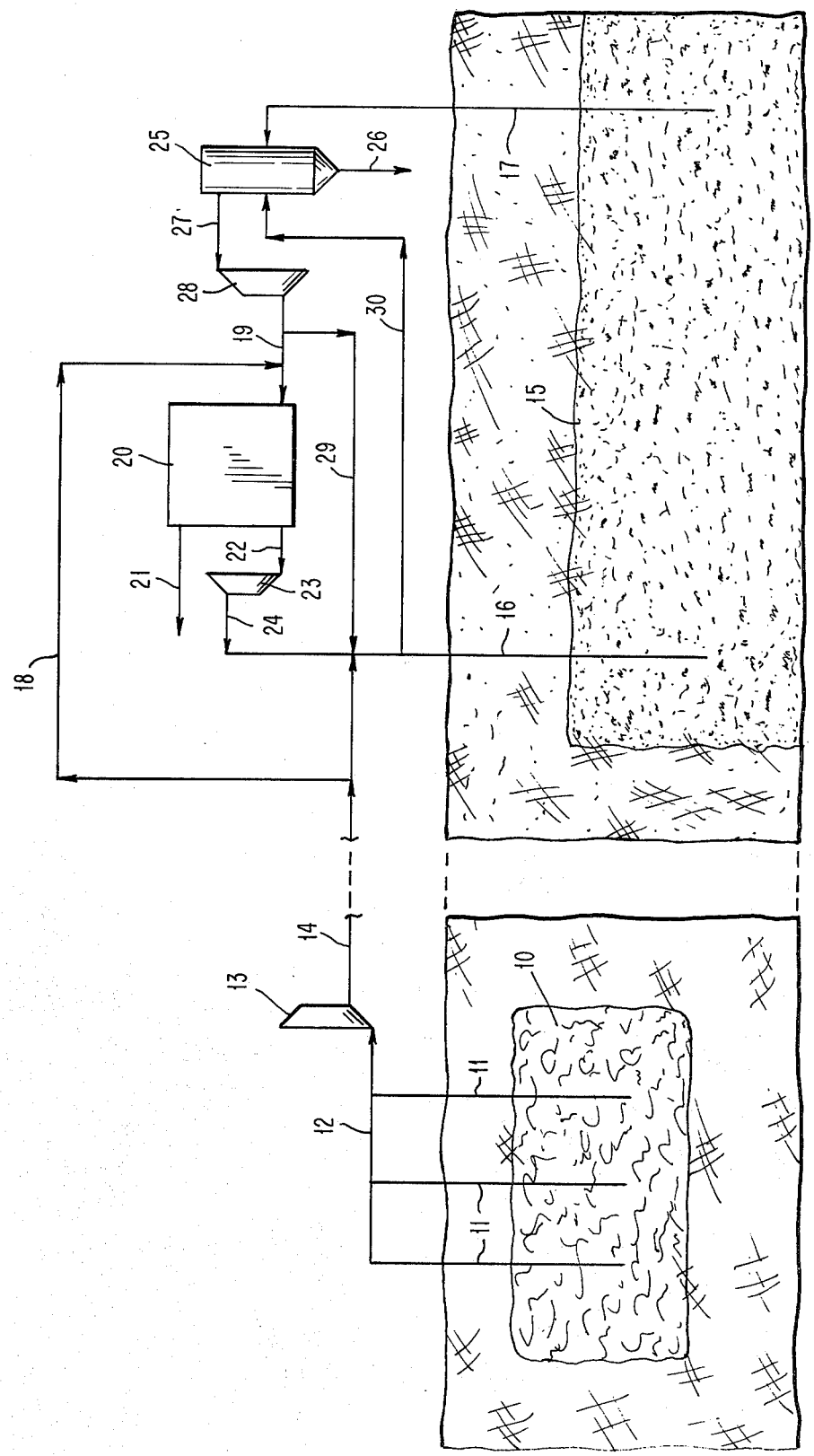

USE OF LAND-FILL GAS TO STIMULATE CRUDE OIL PRODUCTION AND TO RECOVER METHANE-RICH GAS

BACKGROUND OF THE INVENTION

Many urban areas have for a long time disposed of garbage by burying it in neighboring localities which are often of low grade level. Hence, such garbage disposal has also served as land fill. The buried garbage decomposes and generates gas rich in methane and carbon dioxide. Such garbage gas or land-fill gas has in some places become a nuisance because of its escape into the atmosphere. This gas, because of its methane content, generally in the range of about 50 to 70% by volume, has the potential of being a valuable energy resource rather than a distressing atmospheric pollutant. Carbon dioxide, the other principal component of land-fill gas, is generally in the range of about 25 to 45% by volume and thus is a serious deterrent to the commercial utilization of land-fill or garbage gas as a fuel gas.

The international energy crisis has given great impetus to secondary and tertiary recovery of crude oil from wells formerly considered uneconomic to exploit. Diverse processes are being proposed and utilized to stimulate the flow of crude oil from underground formations. One type of process which is finding considerable favor among oil producers involves the injection of carbon dioxide into partially depleted oil reservoirs. However, carbon dioxide has not been available to many oil fields at an economically acceptable price.

Accordingly, a principal object of this invention is to draw garbage gas from a land-fill locality in order to stop or substantially curtail the escape of the gas into the atmosphere and to utilize the withdrawn gas to stimulate the fow of crude oil from a partially depleted reservoir and, in addition, to recover from the thus utilized gas sufficiently purified methane to serve as a commercial fuel gas.

Another important object is to enhance the economic attractiveness of separating methane from land-fill gas and of stimulating oil recovery from wells with the injection of carbon dioxide by combining the two operations.

A further object is to provide a simple and flexible system for carrying out the two combined operations.

These and other objects and advantages of the invention will be evident from the description which follows.

SUMMARY OF THE INVENTION

In accordance with this invention, land-fill gas drawn from buried garbage is compressed and injected into an oil reservoir requiring stimulation, the oil-gas mixture recovered from the stimulated reservoir is separated into a liquid phase comprising crude oil and water and a gas phase comprising methane and carbon dioxide as principal components, and the gas phase is treated to effect separation into a valuable methane-rich fraction and a carbon dioxide-rich fraction which is injected into the oil reservoir. The gas phase may be injected into the reservoir without prior fractionation, while the land-fill gas may first be treated to effect separation into a methane-rich fraction and a carbon dioxide-rich fraction which is then injected into the oil-bearing formation.

The removal of carbon dioxide from gas mixtures is an extensive art. Known processes for the separation of carbon dioxide from other gases utilize refrigeration to cause solid carbon dioxide deposition, a molecular sieve to capture carbon dioxide, chemical absorption, or a combination of such techniques. Scrubbing a gas mixture with a solvent for carbon dioxide has been incorporated in several separation processes. U.S. Pat. Nos. 3,130,026, 3,453,835 and 3,975,172 disclose illustrative scrubbing processes for the removal of carbon dioxide from gas mixtures. In many cases, methanol is the preferred solvent.

The treatment to effect gas separation into a methane-rich fraction and a carbon dioxide-rich fraction for the purposes of this invention is preferably carried out by scrubbing the gas with a solvent for carbon dioxide, particularly chilled methanol.

The terms "land-fill gas" and "garbage gas," for the purposes of this invention, are not only equivalent terms but also are intended to mean any gas which contains methane and carbon dioxide in greater volumetric percentage than all the other components of the gas. Such gas may be obtained from decomposed or fermented biomass such as manure, sewage sludge and marsh gas as well as garbage.

BRIEF DESCRIPTION OF THE DRAWING

The further description of the invention will refer to the appended drawing which is the diagram of a preferred system for achieving enhanced crude oil production from an underground formation through the utilization of garbage gas and for recovering a methane-rich fuel gas from the operation of the system.

DESCRIPTION OF PREFERRED EMBODIMENTS

Land-fill gas is drawn from buried garbage deposit 10 through several collection tubes 11 connected to manifold 12 which in turn is connected to the suction port of compressor 13. In most cases, compressor 13 is a multistage unit with inter-stage cooling and knock-out of condensed moisture.

The compressed land-fill gas then flows through pipeline 14 to partially depleted oil field 15 where it enters injection well 16 to pressurize the underground formation. The injection of land-fill gas into oil reservoir 15 continues for several weeks to attain a considerable partial pressure of carbon dioxide therein. Generally, a $CO_2$ partial pressure of at least about 200 psia (pounds per square inch absolute), preferably at least 400 psia, is established in reservoir 15 so that crude oil with dissolved gas can be readily drawn from production well 17.

Inasmuch as $CO_2$ markedly reduces the viscosity of crude oil, particularly oils having an AP1 gravity less than about 25°, it may be advisable in some cases to enrich the gas injected into well 16 with respect to $CO_2$ content. For this purpose, part or all of the land-fill gas in pipeline 14 may be passed through lines 18 and 19 into fractionation plant 20. As already pointed out, plant 20 may utilize any of the known processes for removing $CO_2$ from a gas mixture. For the purposes of this invention, it is frequently advantageous to scrub the land-fill gas in plant 20 with chilled methanol. Such treatment can simply and economically yield a $CO_2$-rich fraction containing at least 90% by volume $CO_2$. For example, a land-fill gas containing 56% by volume methane and 35% by volume $CO_2$ can be separated into a methane-rich fraction with 86% by volume methane and a $CO_2$-rich fraction with 91% by volume $CO_2$. The methane-rich fraction exiting from plant 20 through line 21 has a high heating value and is suitable for blending with natural gas being distributed in an urban area.

The $CO_2$-rich fraction passes from plant 20 through line 22 and compressor 23 which injects the pressurized gas through line 24 and well 16 into oil reservoir 15. As previously mentioned, when formation 15 has been appreciably stimulated by pressurization with compressed gas and by the resultant solution of especially $CO_2$ in the crude oil, the oil-gas solution is permitted to flow up production well 17 and discharge into separator 25 wherein at about atmospheric pressure the great bulk of the gas is disengaged from the crude oil. The liquid phase dropping to the bottom of separator 25 is withdrawn through line 26. The oily liquid is then further treated to separate water and residual dissolved gas and thus yield marketable crude oil.

The gas phase is drawn from separator 25 through line 27 by compressor 28 which supplies the compressed gas via line 19 to fractionation plant 20. Therein, as already discussed, the gas phase is separated into a methane-rich fraction and a $CO_2$- rich fraction. The methane fraction flows through line 21 to a fuel gas user, while the $CO_2$ fraction is recycled to oil reservoir 15 by passage through line 22, compressor 23, line 24 and injection well 16. This recycle $CO_2$ stream will include $CO_2$ derived from any land-fill gas supplied to plant 20 by line 18.

A further control of the quantity and composition of the gas injected into reservoir 15 is provided by passing gas discharged into line 19 from compressor 28 through line 29 connected to injection well 16.

For simplicity of description, a single production well 17 has been shown in the drawing and referred to in the foregoing discussion. However, skilled oil field workers will understand that generally injection well 16 will have several production wells 17 spaced around it and connected to a manifold discharging the combined flows from wells 17 into separator 25.

As known, a partially depleted oil reservoir can also be stimulated and produced through a single well by the huff-and-puff technique. In such case, gas from pipeline 14 and/or line 24 is injected into oil reservoir 15 through well 16 until the portion of reservoir 15 surrounding well 16 has been pressurized to stimulate an acceptable flow of crude oil. At such time, the injection of gas into well 16 is stopped and crude oil with dissolved gas is permitted to flow up well 16 into line 30 which discharges into separator 25. Thence, the resultant liquid and gas phases follow the courses previously described. During the puff or production portion of the huff-and-puff cycle, the $CO_2$-rich fraction discharged into line 24 is desirably supplied to another well which is in the huff or injection portion of the huff-and-puff cycle. The puff or production period of well 16 is terminated, desirably before the $CO_2$ partial pressure in formation 15 adjacent well 16 drops below 100 psia, and preferably before the $CO_2$ partial pressure drops below about 200 psia. Of course, at the end of the puff period, the huff period is recommenced by injecting gas from line 14 and/or line 24 through well 16 into formation 15. This alternate pressurizing of formation 15 and withdrawing therefrom the resultant oil-gas solution through the same well 16 is continued as long as the quantity of crude oil recovered from a puff period is still economically justified.

As a specific example of the invention, the land-fill gas withdrawn from garbage deposit 10 contains a dry volume basis 56% methane and 35% $CO_2$, the remaining 9% consisting of other hydrocarbons, hydrogen, nitrogen and oxygen. This gas is transmitted several miles through pipeline 14 to partially depleted oil field 15. The crude oil in reservoir 15 has an AP1 gravity of about 18° and a viscosity of about 450 centipoises. The gas of line 14 is injected through well 16 to develop and maintain a pressure of about 1600 psia in reservoir 15 adjacent the discharge end of well 16, the partial pressure of $CO_2$ being approximately 550 psia. The $CO_2$ and methane of the injected gas which become dissolved in the crude oil reduce the viscosity of the oil solution to about 150 centipoises.

This oil-gas solution flows up production well 17 into separator 25 from which the liquid phase is withdrawn through line 26 to recover the crude oil while the gas phase is passed through line 27, compressor 28 and line 19 to fractionation plant 20. Therein the gas phase enters the bottom of a scrubbing column at a pressure of 335 psia while methanol at a temperature of $-55°$ F. is fed to the top of the column. The scrubbed gas issuing from the top of the column is the methane-rich fraction which leaves plant 20 and contains 86% by volume methane. The methanol with absorbed $CO_2$ is withdrawn from the bottom of the scrubbing column and subjected to pressure reduction and heating to strip the dissolved $CO_2$ therefrom. The thus released gas forms the $CO_2$-rich fraction flowing through line 22 to compressor 23.

This $CO_2$ fraction with a $CO_2$ content of 91% by volume is particularly effective in stimulating crude oil production from reservoir 15 when injected through well 16. Thus, month after month during the operation of this embodiment of the invention the total stream of garbage gas from line 14 and recycled $CO_2$ fraction from line 24 which is injected into reservoir 15 through well 16 keeps growing richer in $CO_2$ content.

The total stream supplied to injection well 16 can, if desired, have a $CO_2$ content of 91% by volume simply by diverting the garbage gas from pipeline 14 through lines 18 and 19 into fractionation plant 20. Thus, the garbage gas and the gas phase from separator 25 become the total stream which on issuing from plant 20 through line 22 with a $CO_2$ content of 91% by volume is injected by compressor 23 through well 16 into formation 15. Of course, in each particular case, the cost of passing a greater volume of gas through plant 20 must be weighed against the increased stimulation of oil production resulting from the injection of $CO_2$ of over 90% by volume purity.

The foregoing disclosure has pointed out the great flexibility of the process particularly with respect to the way land-fill gas is combined with recycle gas derived from the stimulated production of crude oil and with respect to the $CO_2$ content of the total gas injected into the oil reservoir. Those skilled in the art will visualize other modifications and variations of the invention without departing from its spirit or scope. Accordingly, only such limitations should be imposed on the invention as are set forth in the appended claims.

What is claimed is:

1. The process of utilizing garbage gas to stimulate crude oil production from a partially depleted reservoir and to recover methane-rich gas, which comprises injecting said garbage gas and/or a carbon dioxide-rich fraction thereof into said reservoir to effect pressurization thereof to a carbon dioxide partial pressure of at least about 200 psia, withdrawing the resultant solution of carbon dioxide in crude oil from said reservoir, separating the withdrawn solution into a liquid phase containing crude oil and a gas phase containing methane and carbon dioxide, fractionating said gas phase into methane-rich gas and carbon dioxide-rich recycle gas, and injecting said recycle gas into said reservoir.

2. The process of claim 1 wherein any fractionation of the garbage gas is carried out on the mixture of said garbage gas with the gas phase containing methane and carbon dioxide.

3. The process of claim 1 wherein the fractionation of the gas phase is carried out by scrubbing said gas phase at elevated pressure with chilled methanol.

4. The process of claim 1 wherein part of the gas phase is injected into the reservoir without prior fractionation.

5. The process of claim 1 wherein the fractionation of the gas phase is carried out by scrubbing said gas phase with a preferential solvent for carbon dioxide.

6. The process of claim 1 wherein the garbage gas contains at least about 50% by volume methane and at least about 25% by volume carbon dioxide.

7. The process of claim 6 wherein the crude oil in the reservoir has an API gravity of not more than about 25° and said reservoir is pressurized to a carbon dioxide partial pressure of at least about 400 psia.

8. The process of claim 7 wherein the fractionation of the gas phase is carried out by scrubbing said gas phase at elevated pressure with chilled methanol to yield carbon dioxide-rich recycle gas containing at least about 90% by volume carbon dioxide.

9. The process of claim 6 wherein the fractionation of the gas phase is carried out by scrubbing said gas phase with a preferential solvent for carbon dioxide to yield carbon dioxide-rich recycle gas containing at least about 90% by volume carbon dioxide and the reservoir is pressurized to a carbon dioxide partial pressure of at least about 400 psia.

* * * * *